`US010665232B2`

United States Patent
Thomsen

(10) Patent No.: US 10,665,232 B2
(45) Date of Patent: May 26, 2020

(54) COORDINATION AMONG MULTIPLE VOICE RECOGNITION DEVICES

(71) Applicant: HARMAN INTERNATIONAL INDUSTRIES, INCORPORATED, Stamford, CT (US)

(72) Inventor: Brant D. Thomsen, Sandy, UT (US)

(73) Assignee: Harman International Industries, Inc., Stamford, CT (US)

( * ) Notice: Subject to any disclaimer, the term of this patent is extended or adjusted under 35 U.S.C. 154(b) by 0 days.

(21) Appl. No.: 15/604,536

(22) Filed: May 24, 2017

(65) Prior Publication Data
US 2018/0342244 A1 Nov. 29, 2018

(51) Int. Cl.
| | |
|---|---|
| *G10L 15/00* | (2013.01) |
| *G10L 15/22* | (2006.01) |
| *G10L 25/60* | (2013.01) |
| *G10L 25/21* | (2013.01) |
| *G10L 15/32* | (2013.01) |
| *G10L 15/02* | (2006.01) |
| *G10L 15/28* | (2013.01) |
| *G10L 15/20* | (2006.01) |

(52) U.S. Cl.
CPC .............. *G10L 15/22* (2013.01); *G10L 15/02* (2013.01); *G10L 15/28* (2013.01); *G10L 15/32* (2013.01); *G10L 25/21* (2013.01); *G10L 25/60* (2013.01); *G10L 15/20* (2013.01); *G10L 2015/223* (2013.01)

(58) Field of Classification Search
CPC combination set(s) only.
See application file for complete search history.

(56) References Cited

U.S. PATENT DOCUMENTS

| | | | |
|---|---|---|---|
| 8,340,975 B1* | 12/2012 | Rosenberger | G10L 15/22 704/270 |
| 9,734,845 B1* | 8/2017 | Liu | G10L 25/78 |
| 2016/0055850 A1 | 2/2016 | Nakadai et al. | |
| 2016/0077794 A1* | 3/2016 | Kim | G10L 15/22 704/270 |
| 2017/0025124 A1 | 1/2017 | Mixter et al. | |
| 2017/0083285 A1* | 3/2017 | Meyers | G10L 15/063 |

(Continued)

OTHER PUBLICATIONS

Extended European Search Report for application No. 18172414.7 dated Oct. 18, 2018.

(Continued)

*Primary Examiner* — Vu B Hang
(74) *Attorney, Agent, or Firm* — Artegis Law Group, LLP

(57) ABSTRACT

One embodiment of the invention sets forth a mechanism for selecting a voice recognition device included in a network of such devices for processing audio commands corresponding to a detected speech event. The voice recognition devices in the network individually determine which one of the devices is best suited to process the audio commands corresponding to the speech event. In operation, each of the voice recognition devices that detected the same speech event independently selects the same device for processing the audio command. Because each of the voice recognition devices, including the selected device, selects the same device for processing the audio command, the voice recognition devices not need to share information related to the selected device with one another.

20 Claims, 3 Drawing Sheets

(56) References Cited

U.S. PATENT DOCUMENTS

2017/0311005 A1* 10/2017 Lin .................... H04L 65/4023
2018/0040322 A1    2/2018 Mixter et al.
2018/0210703 A1    7/2018 Meyers et al.

OTHER PUBLICATIONS

"Sound intensity I and the inverse square law 1/r2," retrieved from http://www.sengpielaudio.com/calculator-squarelaw.htm, last modified Aug. 1, 2014, 9 pages.
Munir, Behzad, "Voice Fundamentals—Human Speech Frequency," retrieved from http://www.uoverip.com/voice-fundamentals-human-speech-frequency/, Mar. 10, 2012, 7 pages.

* cited by examiner

COORDINATION AMONG MULTIPLE VOICE RECOGNITION DEVICES

BACKGROUND OF THE INVENTION

Field of the Invention

The present invention relates generally to voice recognition devices and, more specifically, to coordination among multiple voice recognition devices.

Description of the Related Art

Voice recognition in the consumer space is becoming more and more common. One use case for voice recognition is a stand-alone voice recognition device that listens for a keyword or key phrase and processes any subsequently received voice-based commands. As voice recognition devices become more prevalent, it will be commonplace for an environment, such as a home or an office, to have multiple voice recognition devices within listening range of a given voice-based command.

In practice, voice recognition devices operate independently such that a given device will process every voice-based command that the device receives. This independent operation leads to undesirable results in an environment with many such devices. In particular, each voice recognition device may independently perform an action based on a received voice-based command that should ideally be performed by only one device. For example, a voice-command for increasing the temperature on the thermostat by 5 degrees may be serially and independently performed by multiple devices, causing the temperature to be increased to an uncomfortable or unsafe range.

In some systems, a master device coordinates among the different voice recognition devices to select one of the devices for processing each voice-based command. One drawback of such a system is the increased latency of processing the voice-based command as the master device operates as a coordination intermediary among all of the voice recognition devices. Another drawback of such a system is the requirement of the master device always being present and available. Thus, in situations where the master device goes offline, the entire system fails to operate as desired.

SUMMARY OF THE INVENTION

One embodiment of the present invention sets forth a method for processing speech-based commands. The method includes generating a set of characteristics associated with a speech event that has been detected locally and receiving, from an external device, a second set of characteristics associated with the speech event detected by the external device. The method also includes determining, based on a comparison between the set of characteristics and the second set of characteristics, that an action responsive to the speech event should be performed locally, and performing the action locally.

One advantage of the disclosed method is that a device that locally detects the speech event can independently determine whether it is best suited for processing the audio commands corresponding to the speech event relative to other devices that may have also detected the speech event. In such a manner, each device in a network of devices independently selects the device that is best suited to process audio commands corresponding to the speech event. Another advantage is that situations where duplicative actions are performed by different devices in response to the same speech event are reduced.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
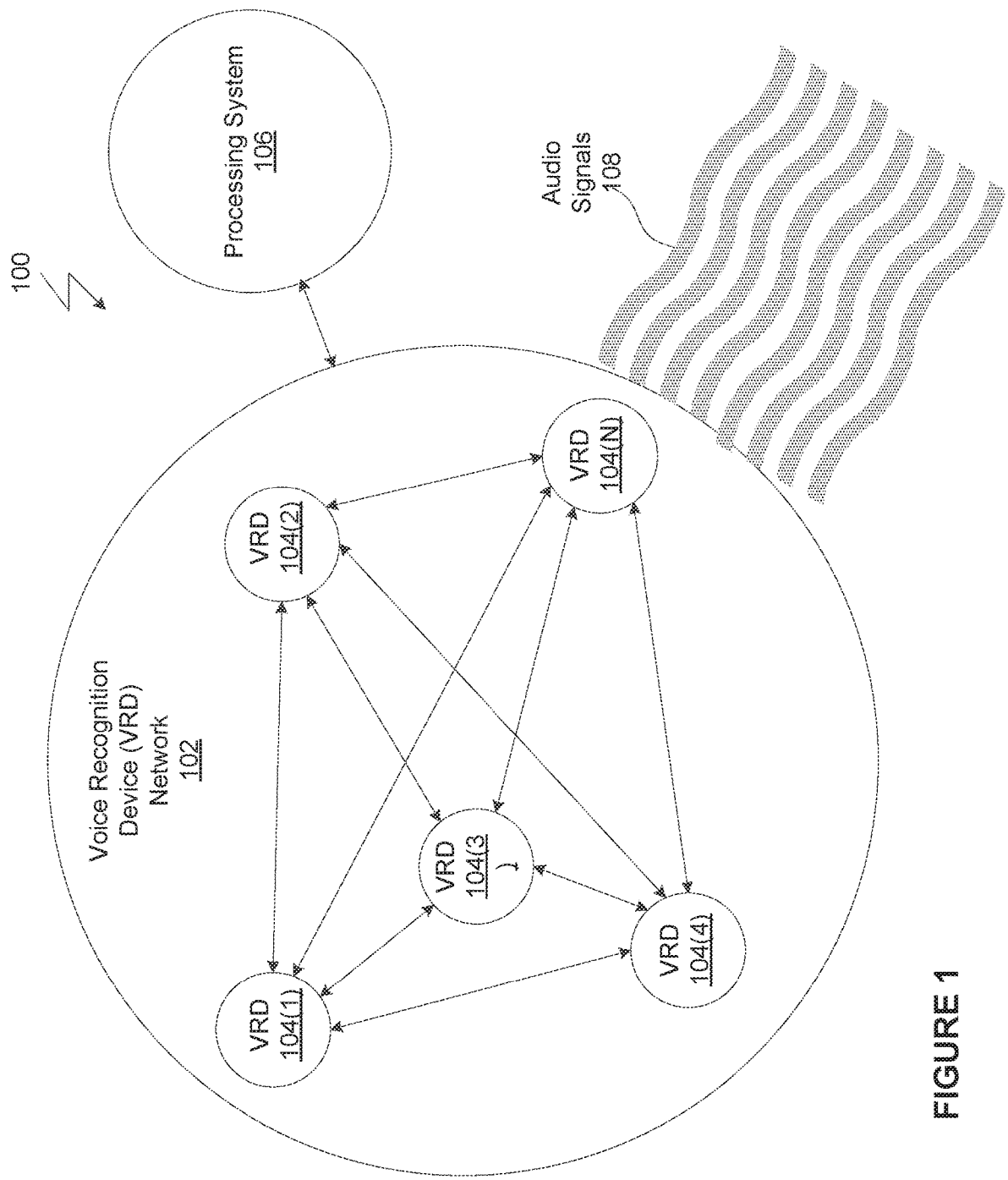
FIG. 1 illustrates a system environment configured to implement one or more aspects of the invention.

FIG. 1 illustrates a system environment 100 configured to implement one or more aspects of the invention. As shown, the system environment 100 includes a voice recognition device (VRD) network 102, a processing system 106, and audio signals 108.

The VRD network 102 includes multiple VRDs 104(1)-(N) (also referred to, collectively, as "VRDs 104" and, individually, as "VRD 104"). In one embodiment, the VRDs 104 in the VRD network 102 are grouped automatically based on network connection, physical proximity, and/or shared user identification. In another embodiment, the VRDs 104 are grouped manually such that a user selects the individual VRDs 104 to be included in the VRD network 102.

Each VRD 104 is controlled by audio commands such that the VRD 104 processes, either fully or partially, audio commands to perform one or more actions. A VRD 104 includes at least one microphone for capturing audio commands (e.g., voice commands spoken by humans). The VRD 104 also includes at least one audio output mechanism (e.g., a speaker) and/or a mechanism for connecting to an external audio output mechanism (e.g., an audio jack or Bluetooth for connecting to an external speaker). The audio output mechanism is used to deliver audio output to a user of the VRD 104. The audio output may be recordings, text-to-speech playback, music, news, etc.

Each VRD 104 is connected via a network connection to every other VRD 104 in the VRD network 102. As described in greater detail below, the VRDs 104 communicate with one another over the network connection to co-ordinate one or more actions performed by the VRDs 104. Further, each VRD 104 is connected via a network connection to the processing system 106 that is remote from the VRD network 102. In one embodiment, the VRD 104 operates in conjunction with the processing system 106 to process audio commands captured via the microphones.

A VRD 104 operates in a "listening" state by processing audio signals 108 that are incident on the microphones to identify spoken keywords or key phrases. Once the keyword or key phrase is identified, the VRD 104 switches to an "action" state by processing any further audio signals 108 that are incident on the microphones to identify audio commands. In one embodiment, in the action state, the VRD 104 performs one or more actions associated with the identified audio commands. In alternative embodiments, in the action state, the audio signals 108 are recorded and transmitted to the processing system 106. The processing system 106 performs one or more voice recognition techniques on the received audio signals 108 to identify the audio commands and, optionally, performs one or more actions associated with the audio commands. The VRD 104 notifies the user of the result of processing the audio commands and any associated actions. The notification can be visual (e.g. flashing lights) and/or audio-based (e.g., prerecorded audio, text-to-speech audio, etc.).

At a given time, the audio signals 108 associated with a speech event are incident on the microphones included in several VRDs 104. Accordingly, the VRDs 104 coordinate to determine which of the VRDs 104 is best suited to process the audio command(s) corresponding to the speech event. In operation, when a given VRD 104 switches to an action state, the VRD 104 determines whether other VRDs 104 in the VRD network 102 also responded to the same speech event that caused the VRD 104 to switch to the action state. If so, then the VRD 104 selects one of the VRDs 104 for processing the audio command corresponding to the speech event. Each of the VRDs 104 that responded to the same speech event independently selects the same VRD 104 for processing the audio command. Because each of the VRDs 104, including the selected VRD 104, selects the same VRD 104 for processing the audio command, the VRDs 104 do not need to share information related to the selected VRD 104 with one another. The following discussion provides details regarding this selection process.

Figure 2:
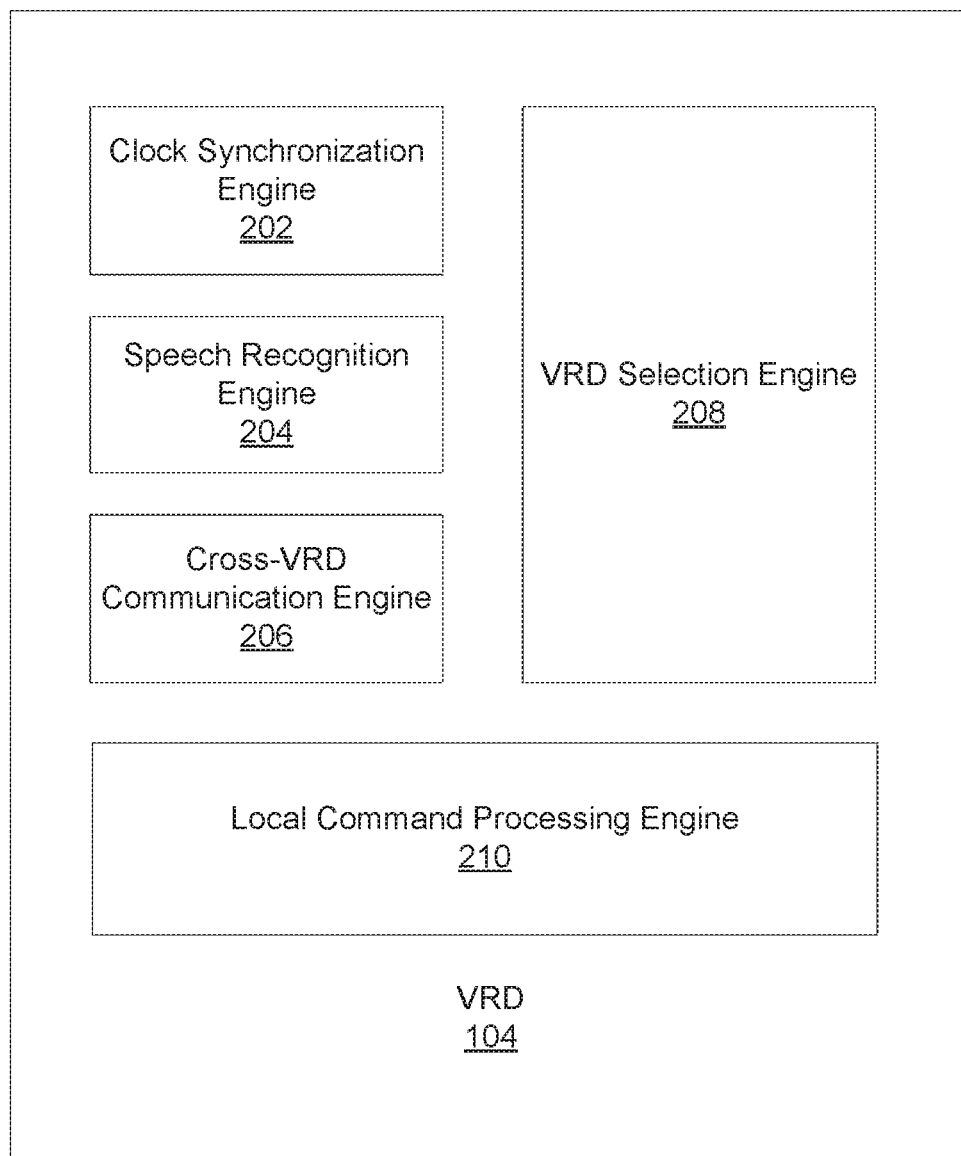
FIG. 2 illustrates a block diagram of a VRD, according to one embodiment.

FIG. 2 illustrates a block diagram of a given VRD 104, according to one embodiment. As shown, the VRD 104 includes a clock synchronization engine, a speech recognition engine 204, a cross-VRD communication engine 206, a VRD selection engine 208, and a local command processing engine 210.

The clock synchronization engine 202 maintains a clock that is synchronized across all VRDs 104 in the VRD network 102. In one embodiment, the synchronized clock is a dedicated clock. In another embodiment, the synchronized clock is a clock value that is calculated by having each VRD 104 track an approximation of the offset of the time difference between a local clock and an agreed-upon master clock. Some techniques for synchronizing clocks include Network Time Protocol (NTP) and Global Positioning Satellite (GPS).

The speech recognition engine 204 analyzes audio signals to recognize the content of speech corresponding to a speech event (referred to herein as the "recognized speech"). In one embodiment, the analysis of the audio signals is based on acoustic models that correspond to a word, phrase, or command from a vocabulary. Persons skilled in the art will understand that any other technique for recognizing the content of speech is within the scope.

The speech recognition engine 204 also generates metadata associated with various characteristics of the recognized speech. In particular, the speech recognition engine 204 generates input quality metrics associated with the recognized speech based on a measure of energy of the received audio signal and the background noise in the audio signal. In one embodiment, since sound intensity from an audio source drops by the square of the distance, the lower the energy of the audio signal, the lower the input quality metrics. The speech recognition engine 204 also generates output quality metrics associated with the recognized speech based on a confidence that the recognized speech is accurate and/or correct relative to the spoken words. Further, the speech recognition engine 204 generates timing information associated with the recognized speech. In one embodiment, the timing information indicates a timestamp captured from the clock synchronization engine 202 corresponding to when the audio signals associated with the recognized speech were received by the VRD 104.

In one embodiment, the speech recognition engine 204 operates in conjunction with the processing system 106 to perform the speech recognition and/or metadata generation operations. In such an embodiment, the speech recognition engine 204 transmits the received audio signals to the processing system 106 and, in response, receives the recognized speech and/or the associated metadata.

The speech recognition engine 204 transmits the recognized speech and the associated metadata corresponding to a locally detected speech event to the cross-VRD communication engine 206 and the VRD selection engine 208. The cross-VRD communication engine 206 transmits the recognized speech and the associated metadata to other VRDs 104 in the VRD network 102. In some embodiments, other VRDs 104 in the VRD network 102 (referred to herein as "external VRDs 104") that detected the same speech event transmit the recognized speech and the metadata corresponding to the externally detected speech event to the cross VRD-communication engine 206. The cross-VRD communication engine 206 transmits the recognized speech and associated metadata from speech recognition engine 204, as well as the recognized speech and associated metadata received from the external VRDs 104 to the VRD selection engine 208.

The VRD selection engine 208 selects one of the VRDs 104 that detected a given speech event for processing commands associated with the speech event. In operation, the VRD selection engine 208 receives from the speech recognition engine 204 recognized speech and the associated metadata corresponding to a locally detected speech event. The VRD selection engine 208 also receives from the cross-VRD communication engine 208 recognized speech and the associated metadata corresponding externally detected speech events. These externally detected speech events are detected by the external VRDs 104. The VRD selection engine 208 determines whether the locally detected speech event is the same as the externally detected speech events, if any, and, if so, determines which of the VRDs 104 that detected the speech event should further process the recognized speech.

To determine whether the locally detected speech event is the same as an externally detected speech event, the VRD selection engine 208 evaluates metadata corresponding to each of the detected speech events. In particular, if the timing information included in the metadata corresponding to the locally detected speech event and an externally detected speech event indicates that the events occurred within a threshold time of one another, then the VRD selection engine 208 determines that the locally and the externally detected speech events are the same. In addition, if the recognized speech corresponding to the locally detected speech event and the externally detected speech event matches (or substantially matches), then the VRD selection engine 208 determines that the locally and externally detected speech events are the same. In some embodiments, the VRD selection engine 208 (i) does not receive recognized speech and metadata corresponding to externally detected speech events or (ii) none of the externally detected speech events is the same as a locally detected speech event. In such embodiments, the VRD selection engine 208 selects the local VRD 104 for further processing the recognized speech.

When one or more external VRDs 104 also detect the speech event, the VRD selection engine 208 in the local VRD 104 selects one of the VRDs 104 for further processing the recognized speech. The selected VRD 104 may either be the local VRD 104 or an external VRD 104. In operation, each VRD selection engine 208 across the different VRDs 104 selects the same VRD 104 for further processing the recognized speech. If the selected VRD 104 is the local VRD 104, then the local VRD 104 continues to process the recognized speech (using local command processing engine 210). If, however, the selected VRD 104 is an external VRD 104, then the local VRD 104 does not process the recognized speech any further.

To select the VRD 104 that will further process the recognized speech, the VRD selection engine 208 evaluates the metadata and/or the content of the recognized speech corresponding to each of the detected speech events. In particular, the VRD selection engine 208 evaluates one or more of the timing information, the input quality metrics, the output quality metrics, and the content of the recognized speech to select the VRD 104 that will further process the recognized speech. The following discussion describes how each of the timing information, the metrics, and the content of the recognized speech can be used by the VRD selection engine 208 individually to make the selection. In other embodiment, the timing information, the metrics, and the content of the recognized speech can be combined using a weighting function or can be used individually or in combination to filter certain VRDs 104 before a final selection.

With respect to the timing information, the VRD selection engine 208 evaluates the timestamps corresponding to the detected speech events and identifies the detected speech event having the earliest timestamp. As discussed above, a timestamp corresponding to a detected speech event indicates a time when the audio signals were received by the VRD 104 that detected the speech event. The VRD 104 that detected the speech event corresponding to the earliest timestamp is selected for further processing the recognized speech. In the event that two or more detected speech events have timestamps that are the same or close in time, the VRD selection engine 208 performs a tie-breaking operation. In one embodiment, the tie-breaking operation selects the VRD 104 with the lowest MAC Address.

With respect to input quality metrics, for each detected speech event, the VRD selection engine 208 computes an input quality score based on the corresponding input quality metrics. To compute the input quality score, the VRD selection engine 208 determines an amount of energy of the audio signal that is within frequencies typical for human speech (e.g., 300 Hz to 3 kHz). If, for a given detected speech event, a less than a threshold amount of the energy of the audio signal is within that range, then the detected speech event is less likely to be human speech or may include significant noise combined with human speech. The VRD selection engine 208 also compares the amount of energy of the audio signal with amounts of energy of audio signals corresponding to previously detected speech events that were successfully processed. If, for a given detected speech event, the amount of energy is within a range of the previously detected speech events, then the detected speech event is more likely to be human speech and the audio signal is likely to be of good quality. The VRD selection engine 208 also determines the overall quality of the received audio. The overall quality of the audio can be based on whether the audio includes recognizable noise (e.g., pops or clicks) and/or the sample rate of the audio.

The VRD selection engine 208 computes the input quality score of a given detected speech event based on the amount of energy within frequencies typical for human speech, the comparison between the amount of energy with previously detected speech events, and the overall quality of the audio. The VRD selection engine 208 may associate numerical values with each of these characteristics and then weigh and sum those numerical values to compute the input quality score. The VRD selection engine 208 compares the input quality scores corresponding to each of the detected speech events to determine which VRD 104 received the best quality audio signal and should be selected for further processing the speech event. In one embodiment, the VRD 104 that detected the speech event having the highest input quality score is selected for further processing the recognized speech. In other embodiments, the VRD selection engine 208 combines the input quality scores with other metrics associated with the detected speech events to make the selection.

With respect to output quality metrics, the VRD selection engine 208 evaluates the output quality metrics corresponding to the detected speech events and identifies the detected speech event having the highest output quality metrics. As discussed above, the output quality metrics associated with recognized speech indicates a confidence that the recognized speech is accurate and/or correct relative to the spoken words. The VRD 104 that detected the speech event corresponding to the highest output quality metrics is selected for further processing the recognized speech. In the event that two or more detected speech events have comparable quality and/or confidence values, the VRD selection engine 208 performs a tie-breaking operation. In one embodiment, the tie-breaking operation selects the VRD 104 with the lowest MAC Address.

With respect to the content of the recognized speech, the VRD selection engine 208 evaluates the content corresponding to the detected speech events and determines the number of VRDs 104 that recognized the same content. When at least a threshold number or percentage of the VRDs 104 recognized the same content, the VRD selection engine 208 selects one of the VRDs 104 that recognized that content for further processing the recognized speech. In the event that at least a threshold number or percentage of the VRDs 104 did not recognize the same content, the VRD selection engine 208 may determine that none of the VRDs 104 should be selected for further processing the recognized speech.

As discussed above, the VRD selection engine 208 can combine the timing information, the metrics, and the content of the recognized speech using a weighting function to select the VRD 104 that will further process the recognized speech. Each VRD selection engine 208 across the different VRDs 104 uses the same criteria to select the same VRD 104 for further processing the recognized speech. If the selected VRD 104 is the local VRD 104, then the local VRD 104 continues to process the recognized speech. If, however, the selected VRD 104 is an external VRD 104, then the local VRD 104 does not process the recognized speech any further. Since each VRD selection engine 208 across the different VRDs 104 selects the same VRD 104 for further processing the recognized speech, the VRDs 104 do not need to communicate the selection to one another.

The local command processing engine 210 locally performs one or more actions associated with audio commands included in the recognized speech. In alternative embodiments, local command processing engine 210 coordinates with the processing system 106 to perform the one or more actions associated with the audio commands. The local command processing engine 210 optionally notifies a user of the result of performing the actions associated with the audio commands. The notification can be visual (e.g. flashing lights) and/or audio-based (e.g., prerecorded audio, text-to-speech audio, etc.)

Figure 3:
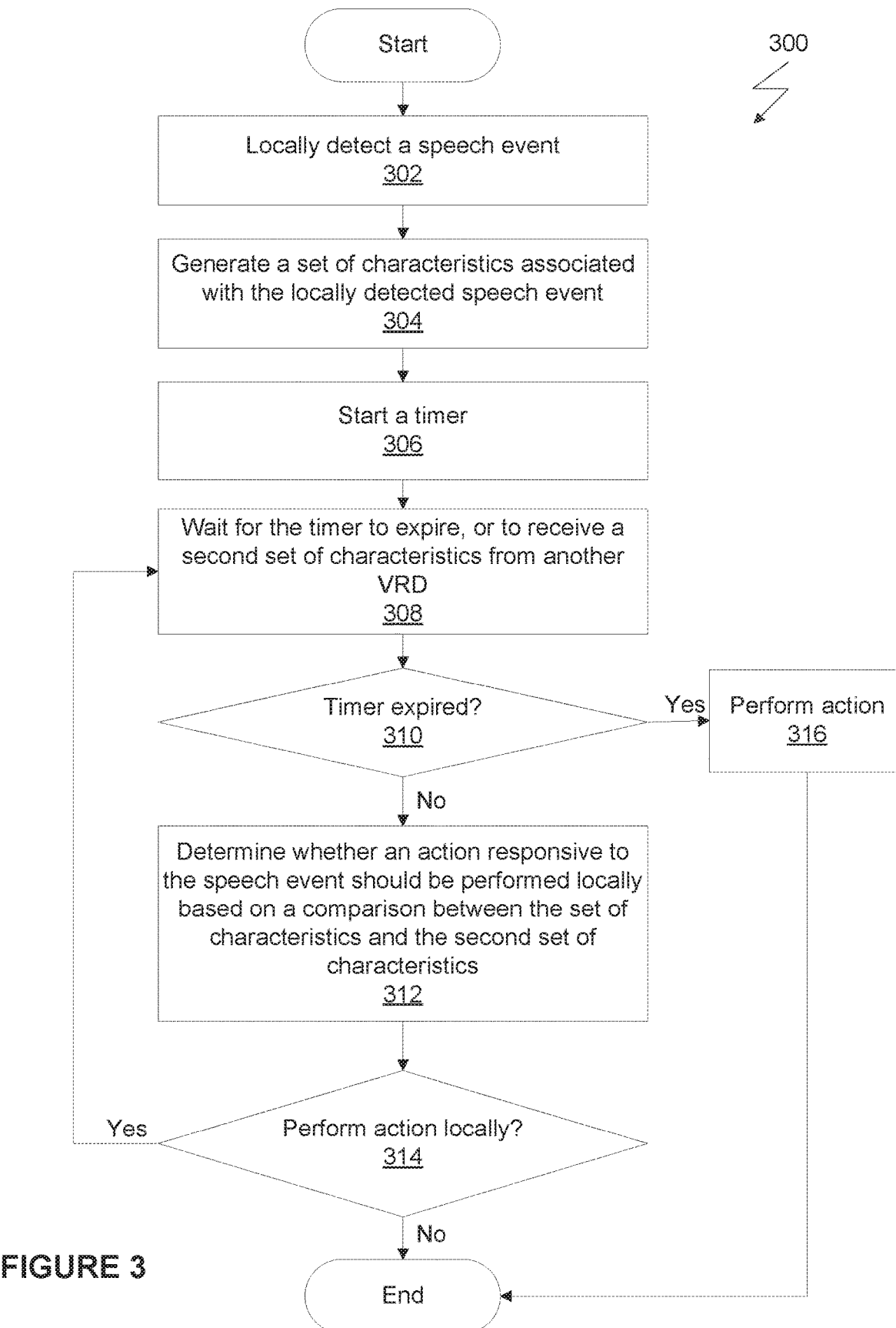
FIG. 3 is a flow diagram of method steps for processing speech-based commands, according to one embodiment.

FIG. 3 is a flow diagram of method steps for processing speech-based commands, according to one embodiment. Although the method steps are described in conjunction with the systems for FIGS. 1-2, persons skilled in the art will understand that any system configured to perform the method steps, in any order, is within the scope of the invention.

The method 300 begins at step 302, where the speech recognition engine 204 in a local VRD 104 locally detects a speech event. The speech recognition engine 204 analyzes audio signals associated with the speech event and recognizes the content of speech corresponding to a speech event. In one embodiment, the analysis of the audio signals is based on acoustic models that correspond to a word, phrase, or command from a vocabulary. Persons skilled in the art will understand that any other technique for recognizing the content of speech is within the scope.

At step 304, the speech recognition engine 204 generates a set of characteristics associated with the locally detected speech event. The characteristics include input quality metrics determined based on a measure of energy of the received audio signal and the background noise in the audio signal. The characteristics also include output quality metrics determined based on a confidence that the recognized speech is accurate and/or correct relative to the spoken words. Further, the characteristics include timing information that indicates a timestamp corresponding to when the audio signals associated with the recognized speech were received by the VRD 104. The speech recognition engine 204 transmits the set of characteristics to the VRD selection engine 208 included in the local VRD 104.

At step 306, the VRD selection engine 208 included in the local VRD 104 starts a timer. The timer period is such that the cross-VRD communication engine 206 included in the local VRD 104 has time to receive the recognized speech and the associated metadata from all other VRDs 104 in the VRD network 102 before the timer expires.

At step 308, the VRD selection engine 208 included in the local VRD 104 waits for the timer to expire, and also waits to receive a second set of characteristics associated with the same speech event that was detected by an external VRD 104. Once either of these events occurs, method 300 proceeds to step 310.

At step 310, if the timer expired at step 308 before any more characteristics were received, then the method 300 proceeds to step 316. Otherwise, at step 308, the VRD selection engine 208 included in the local VRD 104 received a second set of characteristics associated with the same speech event that was detected by an external VRD 104. The characteristics include input quality metrics, output quality metrics, and timing information corresponding to the externally detected speech event. In this case, method 300 proceeds to step 312 for processing the received second set of characteristics.

If characteristics have been received and evaluated by step 314 for every external VRD 104 since the start of method 300, then steps 308 and 310 may treat the timer has having expired, since no more characteristics are expected, rather than having step 308 continue to wait for the timer to expire.

At 312, the VRD selection engine 208 determines whether any further action responsive to the speech event should be performed by the local VRD 104 based on the first set of characteristics and the second set of characteristics. The VRD selection engine 208, in operation, compares the first set of characteristics with the second set of characteristics to determine whether the local VRD 104 is better suited to process audio commands corresponding to the speech event relative to external VRDs 104 that also detected the same speech event.

If, at step 314, the VRD selection engine 208 determines that the local VRD should perform further actions responsive to the speech event, then the method 300 proceeds to step 308 to wait for characteristics from other external VRDs 104. If, however, at step 314 the VRD selection engine 208 determines that the local VRD should not perform further actions responsive to the speech event, then the method 300 ends.

At step 316, the local processing engine 210 locally performs one or more actions responsive to the speech event. In one embodiment, the local processing engine 210 operates in conjunction with the processing system 106 to perform the actions.

In sum, at a given time, the audio signals associated with a speech event are incident on the microphones included in several VRDs 104. Accordingly, the VRDs 104 individually determine which of the VRDs 104 is best suited to process the audio commands corresponding to the speech event. In operation, a VRD 104 that locally detected a speech event determines whether other VRDs 104 in the VRD network 102 also detected the same speech event. If so, then the VRD 104 selects one of the VRDs 104 for processing the audio command corresponding to the speech event. Each of the VRDs 104 that detected the same speech event independently selects the same VRD 104 for processing the audio command. Because each of the VRDs 104, including the selected VRD 104, selects the same VRD 104 for processing the audio command, the VRDs 104 do not need to share information related to the selected VRD 104 with one another.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method for processing speech-based commands, the method comprising:

at a first device included in a plurality of devices:
  detecting a speech event via locally received audio signals;
  recognizing content of the speech event;
  determining a number of other devices included in the plurality of devices that recognized the content of the speech event;
  generating a set of characteristics associated with the speech event;
  receiving, from a second device included in the plurality of devices, a second set of characteristics associated with the speech event detected by the second device;
  determining, based on a comparison between the set of characteristics and the second set of characteristics and based on the number of other devices exceeding a threshold, that an action responsive to the speech event should be performed locally; and
  performing the action locally.

2. The method of claim 1, wherein the set of characteristics includes a frequency of a locally received audio signal corresponding to the speech event, and wherein determining that the action responsive to the speech event should be performed locally comprises determining that the frequency falls within a frequency range associated with human speech.

3. The method of claim 1, wherein the set of characteristics includes a measure of energy of a locally received audio signal corresponding to the speech event, and the second set of characteristics includes a second measure of energy of an externally detected audio signal corresponding to the speech event, and wherein determining that the action responsive to the speech event should be performed locally comprises determining that the measure of energy of the locally received audio signal is greater than the second measure of energy of the externally detected audio signal.

4. The method of claim 1, wherein the set of characteristics includes a measure of quality of locally detected audio corresponding to the speech event, and the second set of characteristics includes a second measure of quality of externally detected audio corresponding to the speech event, and wherein determining that the action responsive to the speech event should be performed locally comprises determining that the measure of quality of the locally detected audio is higher than the second measure of quality of the externally detected audio.

5. The method of claim 1, wherein the set of characteristics includes a timestamp corresponding to when the speech event was detected locally, and the second set of characteristics includes a timestamp corresponding to when the speech event was detected by the second device, and wherein determining that the action responsive to the speech event should be performed locally comprises determining that the speech event was detected locally before the speech event was detected by the second device based on the timestamps.

6. The method of claim 1, wherein the set of characteristics includes a confidence score associated with spoken content recognized from the speech event detected locally, and the second set of characteristics includes a second confidence score associated with spoken content recognized from the speech event detected by the second device, and wherein determining that the action responsive to the speech event should be performed locally comprises determining that the confidence score of the locally detected audio is higher than the second confidence score.

7. The method of claim 1, wherein the set of characteristics includes a confidence score associated with spoken content recognized from the speech event, and wherein determining that the action responsive to the speech event should be performed locally comprises determining that the confidence score is greater than a threshold value.

8. The method of claim 1, wherein the set of characteristics includes spoken content recognized from the speech event, and the second set of characteristics includes second spoken content recognized from the speech event, and wherein determining that the action responsive to the speech event should be performed locally comprises determining that the spoken content substantially matches the second spoken content.

9. The method of claim 1, further comprising:
  generating a third set of characteristics associated with a second speech event that has been detected locally;
  receiving, from the second device, a fourth set of characteristics associated with the second speech event detected by the second device;
  determining, based on a comparison between the third set of characteristics and the fourth set of characteristics, that an action responsive to the speech event should be performed by the second device; and
  terminating local processing of the second speech event.

10. A computer readable medium storing instructions that, when executed by a processor of a first device in a plurality of devices, cause the processor to process speech-based commands, by performing the steps of:
  detecting a speech event via locally received audio signals;
  recognizing content of the speech event;
  determining a number of devices included in the plurality of devices that recognized the content of the speech event;
  generating a set of characteristics associated with the speech event;
  receiving, from a second device included in the plurality of devices, a second set of characteristics associated with the speech event detected by the second device;
  determining, based on a comparison between the set of characteristics and the second set of characteristics and based on the number of devices included in the plurality of devices exceeding a threshold, that an action responsive to the speech event should be performed locally; and
  performing the action locally.

11. The computer readable medium of claim 10, wherein the set of characteristics includes a frequency of a locally received audio signal corresponding to the speech event, and wherein determining that the action responsive to the speech event should be performed locally comprises determining that the frequency falls within a frequency range associated with human speech.

12. The computer readable medium of claim 10, wherein the set of characteristics includes a measure of energy of a locally received audio signal corresponding to the speech event, and the second set of characteristics includes a second measure of energy of an externally detected audio signal corresponding to the speech event, and wherein determining that the action responsive to the speech event should be performed locally comprises determining that the measure of energy of the locally received audio signal is greater than the second measure of energy of the externally detected audio signal.

13. The computer readable medium of claim 10, wherein the set of characteristics includes a measure of quality of locally detected audio corresponding to the speech event, and the second set of characteristics includes a second measure of quality of externally detected audio corresponding to the speech event, and wherein determining that the action responsive to the speech event should be performed locally comprises determining that the measure of quality of the locally detected audio is higher than the second measure of quality of the externally detected audio.

14. The computer readable medium of claim 10, wherein the set of characteristics includes a timestamp corresponding to when the speech event was detected locally, and the second set of characteristics includes a timestamp corresponding to when the speech event was detected by the second device, and wherein determining that the action responsive to the speech event should be performed locally comprises determining that the speech event was detected locally before the speech event was detected by the second device based on the timestamps.

15. The computer readable medium of claim 14, wherein the timestamps are determined based on a synchronized clock.

16. The computer readable medium of claim 10, wherein the instructions further cause the processor to perform the step of determining that the speech event detected by the second device matches the speech event that has been detected locally.

17. The computer readable medium of claim 16, wherein determining that the speech event detected by the second device matches the speech event that has been detected locally comprises comparing an external timestamp corresponding to when the second device detected the speech event with a local timestamp corresponding to when the speech event was detected locally.

18. The computer readable medium of claim 16, wherein determining that the speech event detected by the second device matches the speech event that has been detected locally comprises comparing first content recognized based on the speech event detected by the second device with second content recognized based on the speech event that has been detected locally.

19. A voice recognition system, comprising, at a first device included in a plurality of devices:
a microphone; and
a computer processor, executing instructions, to perform the steps of:
detecting a speech event via audio signals locally received via the microphone;
recognizing content of the speech event;
determining a number of devices included in the plurality of devices that recognized the content of the speech event;
generating a set of characteristics associated with the speech event,
receiving a second set of characteristics associated with the speech event that has been detected externally by another device included in the plurality of devices,
determining, based on a comparison between the set of characteristics and the second set of characteristics and based on the number of devices included in the plurality of devices exceeding a threshold, that an action responsive to the speech event should be performed locally, and
performing the action locally.

20. The voice recognition system of claim 19, wherein the instructions further cause the processor to perform the steps of:
generating a third set of characteristics associated with a second speech event that has been detected locally via the microphone;
receiving, from the another device included in the plurality of devices, a fourth set of characteristics associated with the second speech event that has been detected externally by the another device included in the plurality of devices;
determining, based on a comparison between the third set of characteristics and the fourth set of characteristics, that an action responsive to the speech event should be performed by the another device included in the plurality of devices; and
terminating local processing of the second speech event.

* * * * *